US012607496B2

(12) United States Patent
Tooley et al.

(10) Patent No.: US 12,607,496 B2
(45) Date of Patent: Apr. 21, 2026

(54) METHOD AND SYSTEM FOR WIRELESS VEHICLE TANK MONITORING

(71) Applicants: Matthew John Tooley, Stafford, VA (US); Carla G Surratt, Stafford, VA (US)

(72) Inventors: Matthew John Tooley, Stafford, VA (US); Carla G Surratt, Stafford, VA (US)

( * ) Notice: Subject to any disclaimer, the term of this patent is extended or adjusted under 35 U.S.C. 154(b) by 243 days.

(21) Appl. No.: 18/364,890

(22) Filed: Aug. 3, 2023

(65) Prior Publication Data

US 2025/0044142 A1 Feb. 6, 2025

(51) Int. Cl.
| | |
|---|---|
| *G01F 23/80* | (2022.01) |
| *G01F 23/263* | (2022.01) |
| *B60N 3/18* | (2006.01) |
| *B60R 15/00* | (2006.01) |

(52) U.S. Cl.
CPC .......... *G01F 23/802* (2022.01); *G01F 23/266* (2013.01); *B60N 3/18* (2013.01); *B60R 15/00* (2013.01)

(58) Field of Classification Search
CPC ....... G01F 23/802; G01F 23/266; B60N 3/18; B60R 15/00
See application file for complete search history.

(56) References Cited

U.S. PATENT DOCUMENTS

| | | | | |
|---|---|---|---|---|
| 6,711,949 B1 * | 3/2004 | Sorenson | ................ | G01F 23/38 |
| | | | | 73/317 |
| 6,748,805 B2 * | 6/2004 | Lease | ....................... | G01F 23/80 |
| | | | | 340/623 |
| 2011/0265562 A1 * | 11/2011 | Li | .......................... | A47J 27/212 |
| | | | | 73/304 C |
| 2021/0256837 A1 * | 8/2021 | DeQuarto | .............. | G08C 17/02 |
| 2023/0052179 A1 * | 2/2023 | Pickering | ............... | B64D 45/00 |

* cited by examiner

*Primary Examiner* — Elias Desta

(57) ABSTRACT

The present invention is a wireless vehicle tank monitoring system using non-contact fluid level sensors with adjustable sensitivity to measure fluid levels in recreational vehicle holding tanks. A smart device application on a portable computer receives real-time data via Bluetooth Low Energy (BLE) communication. The user-friendly interface displays graphical tank states. The system optimizes power efficiency through deep sleep and selective notification techniques, extending battery life. Sensors' sensitivity adapts to different tank wall thicknesses for accurate readings. The integration of non-contact sensors and power-efficient communication ensures reliability, easy installation, and real-time data transmission. This cost-effective solution effectively manages fluid levels in recreational vehicles.

16 Claims, 6 Drawing Sheets

METHOD AND SYSTEM FOR WIRELESS VEHICLE TANK MONITORING

BACKGROUND OF THE INVENTION

The present invention pertains to the field of remote sensing, with a specific focus on monitoring fluid levels in fresh water and waste water holding tanks of recreational vehicles.

Currently, tank level monitoring systems for recreational vehicles commonly use sensors either mounted inside the tank or on the outside of the tank. These systems typically feature fixed sensitivity, which can lead to false readings due to variations in the tank caused by contaminants inside the tank. Moreover, these systems are wired directly to a display and require a constant power source. Such limitations have prompted the need for an improved solution.

It is desirable to develop a tank monitoring system that overcomes these drawbacks. This solution should encompass the following features:

Non-contact sensors: The sensors should not require mounting inside the tank and should possess adjustable sensitivity to account for changes to the tank's conditions.

Wireless communication: The system should eliminate the need for wired connections between the sensors and the display.

Mobile data display: The data display should be conveniently located anywhere inside or near the recreational vehicle.

Warning system: The system should implement a warning mechanism to alert users when the fluid levels in the tanks reach critical levels.

Historical data storage: The system should be capable of storing historical data to track fluid usage patterns and trends over time.

Addressing these needs will lead to an innovative and efficient tank monitoring system for recreational vehicles.

SUMMARY OF THE INVENTION

The present invention provides a novel method and system for accurately measuring the fluid level of a plurality of fluid tanks in a vehicle such as a recreational vehicle using plurality of non-contact fluid level sensors that are mounted on the outside of tank(s) and does not require any modifications to the tank, measures a plurality of fluid level thresholds in the tank, processes the the data from the plurality of sensors and converts it into meaningful information such as the current fluid level in the holding tank that is displayed on digital display inside the RV or on a mobile app, and uses power management techniques to optimize the power usage to eliminate the need for powering it from the recreational vehicle's power system. The exemplary embodiments of the present invention describe a method, system and apparatus for measuring the fluid level state in a plurality of fluid holding tanks as input to a locally attached microcontroller based controller to process the sensor data and convert it into meaningful information for display on a data display and tracks fluid usage patterns and trends over time to implement a warning system to notify the user when the tank reaches critical levels and to help users plan their trips and optimize tank usage.

DETAILED DESCRIPTION OF THE INVENTION

Figure 1:
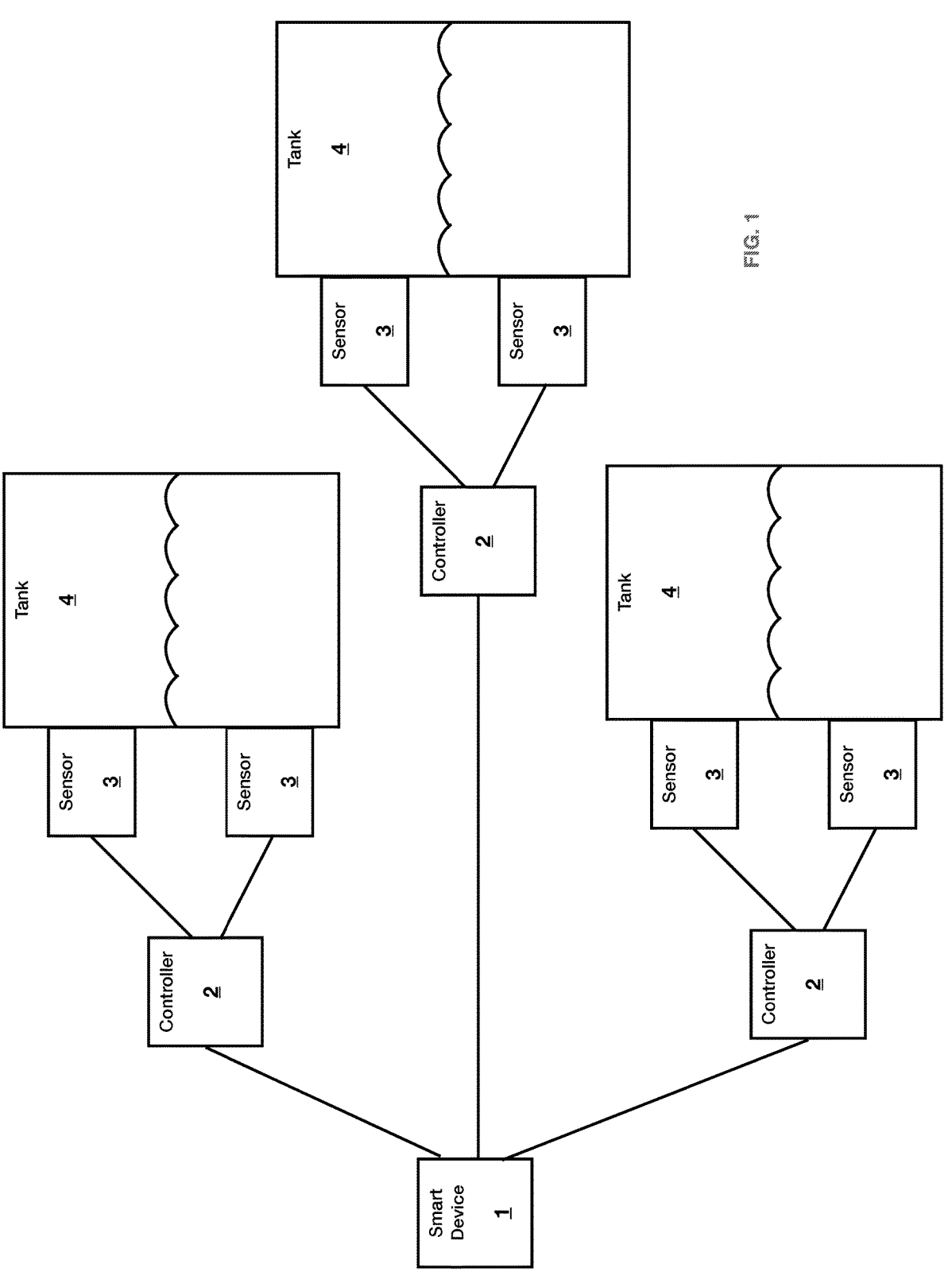
FIG. 1 is a partial block diagram of the method and system for measuring the fluid level in the tanks.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. In other instances, well-known features have not been described in detail to avoid obscuring the invention.

In a broad embodiment, the present invention is a comprehensive method, system, and apparatus designed for efficient fluid level monitoring in recreational vehicles. The invention incorporates a plurality of non-contact fluid level sensors with adjustable sensitivity, enabling accurate measurements of the fluid level states in multiple fluid holding tanks within the recreational vehicle. These sensors are connected to a controller that processes and analyzes the sensor readings, providing real-time data on the current fluid levels in each tank.

The system further comprises a second computer that receives the analyzed sensor data from the controller and processes it for display on a data display interface. This graphical representation allows users to easily monitor the fluid level states in their tanks and make informed decisions regarding fluid management.

To enhance safety and prevent issues arising from critical fluid levels, the invention implements a warning system. When the fluid levels in any of the tanks reach critical levels, the system promptly notifies the user, enabling them to take appropriate actions.

To facilitate future planning and analysis, the invention stores historical data. This feature allows users to track fluid usage patterns and trends over time, enabling them to optimize their fluid resources during travel and camping.

Efficient power management techniques are integrated into the invention, minimizing power consumption and enabling it to run from a local power source, such as a battery. This ensures prolonged operation without excessive power drain and eliminates the need to power the system from the vehicles power system.

The system employs wireless communications to transmit the data from the controller to the data display interface. Utilizing wireless connectivity reduces the complexity of installation and ensures seamless and reliable data transmission between the sensor-equipped tanks and the remote data display device.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

Throughout this disclosure the term 'tank' is used to describe a container capable of holding fluids. On recreational vehicles the tanks can be used to hold fresh water commonly referred to as the fresh water tank, waster water from sinks and showers commonly referred to as gray water tank, and waster water from toilets commonly referred to as black water tank.

In the context of recreational vehicles (RVs) and other similar vehicles, there are typically three primary types of fluid holding tanks, each serving a specific purpose. These tanks are commonly found in RVs and motorhomes and are crucial for providing essential amenities during travel and camping. The wireless vehicle tank monitoring system described in the patent application can be designed to monitor and manage the fluid levels in these tanks efficiently. The fresh water tank is used to store potable (drinking) water that is used for various purposes within the RV. This includes drinking, cooking, cleaning, and showering. Before embarking on a trip or camping adventure, RV owners typically fill the fresh water tank with clean and safe drinking water. As the RV travels, the occupants can access and use the water from the fresh water tank for their daily needs. The wireless vehicle tank monitoring system continuously monitors the fluid level in the fresh water tank. This allows users to keep track of the remaining fresh water supply, ensuring that they have enough water for the duration of their journey and can plan for refilling the tank when needed. The gray water tank collects wastewater from sinks, showers, and other sources within the RV that do not contain human waste (e.g., from kitchen and bathroom sinks). As the occupants use water in the RV for various tasks, such as washing dishes or taking showers, the gray water tank collects and temporarily stores the wastewater. This prevents wastewater from being directly released onto the ground and helps manage environmental impact. The wireless vehicle tank monitoring system monitors the fluid level in the gray water tank. This allows users to monitor the tank's capacity and prevent overfilling, which could lead to unwanted spills and potential environmental concerns. The black water tank collects and stores wastewater from the RV's toilet system. This tank contains human waste and requires proper treatment and disposal. The black water tank provides a hygienic and environmentally responsible way to manage human waste during RV travels. Properly managing black water is essential for minimizing environmental impact and complying with regulations in campgrounds and other designated areas. The wireless vehicle tank monitoring system monitors the fluid level in the black water tank. This allows users to monitor the tank's capacity and ensure that it is emptied at appropriate facilities to maintain proper hygiene and adhere to environmental guidelines. The wireless vehicle tank monitoring system integrates with each of these fluid holding tanks in the RV. It collects fluid level data from non-contact fluid level sensors mounted on the outside of each tank. The collected data is then transmitted wirelessly to a remote portable computer (e.g., a smartphone or tablet) running the smart device application. With the integrated monitoring system, RV occupants can have real-time visibility into the fluid levels in all their tanks, ensuring they have sufficient fresh water supply, managing wastewater responsibly, and preventing tank overflows or leakages. The system's user-friendly interface provides a graphical display of the fluid level states, customizable notifications, and configuration options, making it easy for users to manage their RV's fluid resources efficiently and enhance their travel and camping experiences.

"Vehicle" as used herein means both powered vehicles and non-powered vehicles, trailers, or the like and includes but is not limited to cars, trucks, recreational vehicle, recreational vehicle trailers, or the like.

As used in this patent application, the term "vehicle" has a broad scope and includes both powered vehicles and non-powered vehicles, as well as trailers and similar mobile units. The term encompasses a wide range of vehicles, such as cars, trucks, recreational vehicles (RVs), camper vans, motorhomes, trailers, and any other mobile units designed for transportation or habitation. Powered vehicles refer to those equipped with an internal combustion engine, electric motor, or other power source that enables them to move independently. This category includes conventional automobiles, trucks, buses, motorcycles, and other motorized vehicles used for transportation purposes. Non-powered vehicles are those without a built-in propulsion system and typically require external force or towing for movement. Examples include trailers, towed campers, caravans, and similar mobile units designed to be towed by powered vehicles.

Recreational vehicles (RVs) encompass a wide variety of motorhomes, campervans, camper trailers, and other self-contained living spaces designed for travel and temporary habitation. RVs are equipped with living amenities, such as sleeping quarters, kitchen facilities, and bathroom facilities, allowing travelers to have a comfortable and mobile dwelling while on the road.

As used in this patent application, the term "Smart device" refers to a category of portable electronic devices equipped with certain key features, including a display, wireless transceiver, and computing capabilities. These devices are designed to be easily carried and used on the go. Examples of smart devices include smartphones, tablets, laptops, and other similar handheld or portable electronic devices.

A "Smart device application," as used in this disclosure, specifically refers to a software application that runs on a smart device and is capable of performing specific functions or tasks. The application is stored in a non-transitory computer-readable medium, such as the device's internal memory or storage, and contains computer-executable instructions. When the application is executed by the processor of the smart device, it controls and utilizes the device's capabilities to carry out the intended functionalities.

The term "non-transitory computer-readable medium" indicates that the application's instructions are stored in a form that is not transitory or temporary, meaning the data persists even when the power is turned off. It includes, but is not limited to, physical storage media like internal memory, solid-state drives (SSDs), hard disk drives (HDDs), and external storage devices like USB drives or memory cards.

The smart device application in the context of this patent application serves as a crucial component of the wireless vehicle tank monitoring system, allowing users to interact with the system and access real-time fluid level data from the non-contact fluid level sensors. By providing this definition, the patent application clarifies the role and functionality of both smart devices and their corresponding applications within the context of the invention.

In the context of this patent, the term "microcontroller" refers to a compact, integrated electronic device that combines essential components of a computer into a single chip. The microcontroller serves as the central processing unit (CPU) of the tank monitoring device, responsible for controlling its operations, processing data, and executing specific tasks.

The microcontroller typically includes a CPU core, volatile memory (RAM) for temporary data storage, non-volatile memory (ROM or flash memory) for storing the device's program code, and various input/output (I/O) ports for interfacing with external components and sensors. Additionally, it may incorporate timers, counters, and other specialized peripherals tailored to the specific functionalities of the tank monitoring system.

The microcontroller acts as the brain of the tank monitoring device, executing the software algorithms that manage the fluid sensors, process sensor data, and communicate with the smart device application. It operates based on a set of instructions (program code) stored in its non-volatile memory, which dictate its behavior and decision-making capabilities.

In the context of this patent, the microcontroller is programmed to perform a series of tasks, such as reading the sensor data, analyzing the fluid level readings, updating the smart device application, managing power to the fluid sensors, and entering low-power modes to conserve energy. Its ability to execute these tasks efficiently and with high precision makes it a critical component of the tank monitoring system.

The use of a microcontroller enables the tank monitoring device to be compact, cost-effective, and power-efficient, making it suitable for implementation in various recreational vehicles. The microcontroller's programmable nature allows for flexibility and adaptability, enabling the device to be tailored to specific fluid holding tanks and user preferences.

Throughout this patent, the term "microcontroller" refers to the integrated electronic chip responsible for controlling the tank monitoring device's operations and executing the software instructions required for real-time fluid level monitoring and management. It is an essential element that contributes to the overall functionality, efficiency, and user-friendliness of the disclosed invention.

"Tank monitoring device," is used herein meaning a device that includes one or more non-contact fluid level sensors, a microcontroller for reading, analyzing, and sending the analyzed results to a second computer.

"Tank monitoring system" is herein meaning a system for reading, analyzing, and displaying the readings from one or more tank monitoring devices.

In one or more embodiments of the present invention there is one tank monitoring device for each of the vehicles tanks—fresh, gray, and black.

The present invention employs non-contact fluid level sensors to accurately measure the fluid level inside a container or fluid holding tank without the need for physical contact with the fluid. These non-contact fluid level sensors utilize various technologies, such as ultrasonic, optical, pressure, and capacitive level sensors, to achieve this functionality.

The term "Non-contact fluid level sensor" and "fluid level sensor" are used interchangeably in this patent application and refer to sensors that do not require physical contact with the fluid they are measuring. These sensors utilize ultrasonic, optical, pressure, or capacitive technologies to measure the fluid level.

Ultrasonic level sensors, one of the non-contact technologies, utilize sound waves to determine the fluid level. The sensor consists of a transducer emitting high-frequency sound pulses (ultrasonic waves) and a receiver that detects the reflected sound waves. By measuring the time taken for the sound waves to bounce back from the fluid's surface, the sensor can calculate the distance from the sensor to the fluid's surface and determine the fluid level.

Optical level sensors, another non-contact technology, use light to measure fluid levels. The sensor emits light, such as infrared or visible light, towards the fluid surface. By measuring the amount of light reflected or absorbed by the fluid, the sensor can determine the fluid level. Some optical sensors may use a prism or fiber-optic cable to guide the light, enhancing accuracy.

Capacitive level sensors, a third type of non-contact technology, rely on varying capacitance between the sensor and the fluid. These sensors consist of two conductive plates separated by an insulating material (dielectric). When the fluid approaches the sensor, it acts as the dielectric, leading to a change in capacitance. This variation in capacitance is proportional to the fluid level, enabling the sensor to determine the fluid level.

Each type of non-contact fluid level sensor has its own advantages and limitations, and the choice of sensor technology depends on factors like the type of fluid, container characteristics, environmental conditions, and required accuracy. Non-contact fluid level sensors are extensively used across various industries due to their reliability, safety, and ability to measure fluids without direct contact, making them suitable for applications involving corrosive, hazardous, or sensitive fluids.

In this patent application, specific embodiments utilize capacitive level sensors with adjustable sensitivity to cater to different thicknesses of tank walls. Capacitance sensors offer the advantage of sensitivity adjustment by varying the distance between plates in the capacitor, ensuring accurate fluid level measurements in varying tank configurations.

FIG. 1 illustrates a block diagram of the tank monitoring system. The system comprises a smart device (1) connected to multiple tank monitoring devices. Each tank monitoring device consists of a controller (2) and one or more fluid level sensors (3) mounted on the exterior of a tank (4). In certain embodiments, the smart device may only be connected to one or two controllers, providing flexibility in the system configuration.

The smart device (1) serves as the central hub for the tank monitoring system, enabling communication and data processing. It is a portable electronic device with a display, wireless transceiver, and computing capabilities, such as a smartphone, tablet, laptop, or similar device.

Each tank monitoring device includes a dedicated controller (2) responsible for managing the data from the fluid level sensors and facilitating communication with the smart device. The controller serves as an intermediary between the fluid level sensors and the smart device, processing and analyzing the sensor readings to determine the current fluid level within the tank.

Mounted on the exterior of each tank (4) are one or more fluid level sensors (3). These non-contact fluid level sensors, which can be of various technologies like ultrasonic, optical, pressure, or capacitive sensors, measure the fluid level inside the tank without direct contact with the fluid.

The smart device (1) communicates with the controllers (2) in the tank monitoring devices to receive real-time fluid level data from the fluid level sensors (3). The data processing and analysis are carried out by the controllers before transmitting the information to the smart device.

In some configurations, the smart device (1) may only be connected to a subset of the controllers (2) controlling specific tank monitoring devices. This allows for customizable and scalable implementations of the tank monitoring system, depending on the number and type of tanks to be monitored.

Overall, the tank monitoring system depicted in FIG. 1 provides an efficient and flexible solution for monitoring fluid levels in various tanks using a smart device as the central monitoring and control interface.

Figure 2:
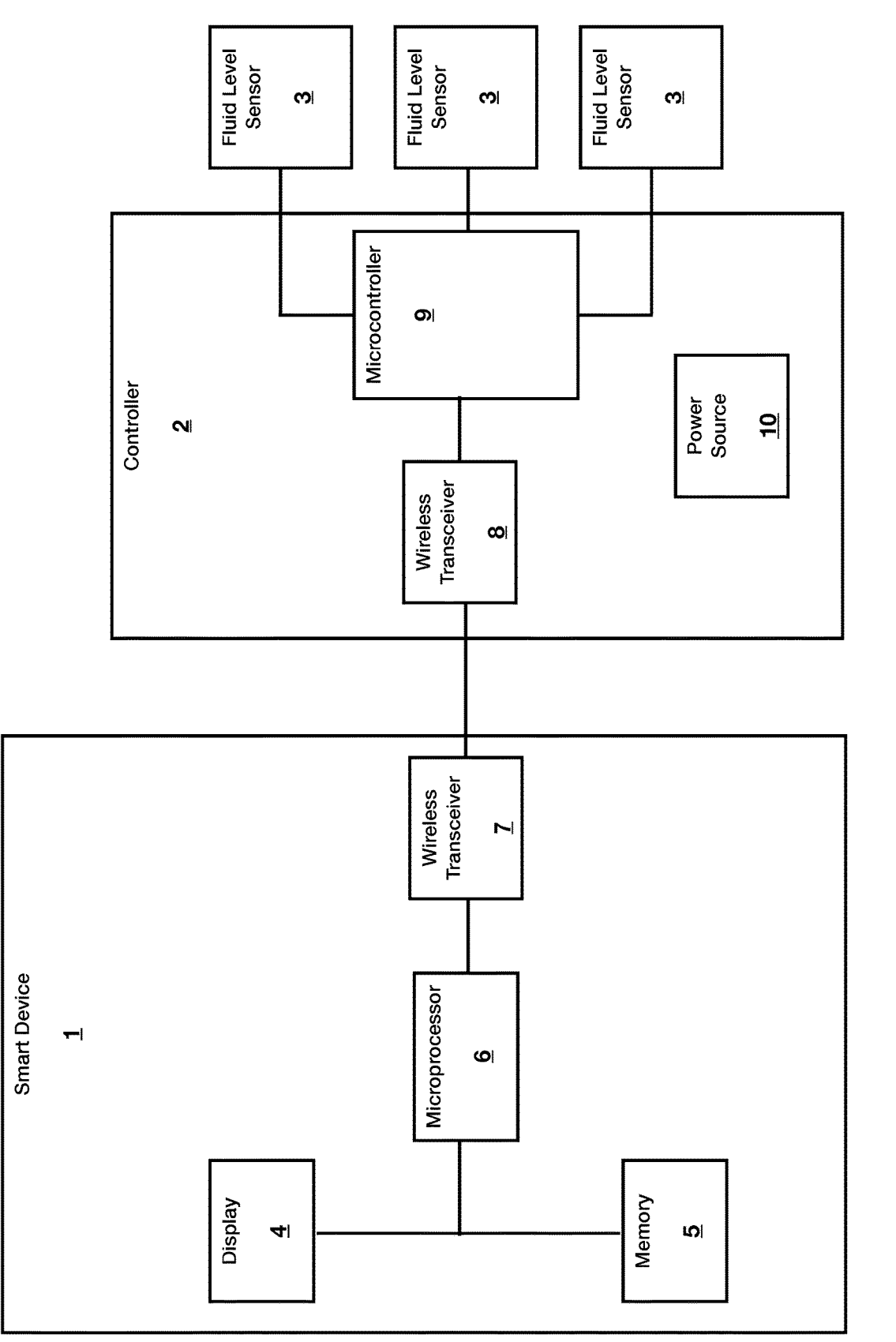
FIG. 2 is a partial block diagram showing the smart device and tank device.

FIG. 2 presents a block diagram illustrating the primary components of both the smart device (1) and the tank monitoring device's controller (2).

The Smart Device (1):

Display (4): The smart device features a display that allows users to view real-time data and information related to the fluid levels in the tanks. The display provides a user-friendly interface for interacting with the tank monitoring system.

Storage (Volatile and Non-Volatile Memory) (5): This storage component is used to store both temporary (volatile) and permanent (non-volatile) data. It holds essential system data, configurations, and information about the fluid levels in the monitored tanks.

Microprocessor (6): The microprocessor serves as the central processing unit of the smart device, handling various tasks related to data processing, user interface management, and communication with the tank monitoring devices' controllers.

Wireless Transceiver (7): The smart device is equipped with a wireless transceiver that enables it to establish communication with the tank monitoring devices' controllers. This wireless communication facilitates the exchange of data and instructions between the smart device and the controllers.

The Tank Monitoring Device's Controller (2):

Wireless Transceiver (8): Similar to the smart device, the controller is equipped with a wireless transceiver to establish communication with the smart device. This allows the controller to send fluid level data and receive instructions from the smart device.

Microcontroller (9): The microcontroller acts as the processing unit of the controller. It is responsible for managing data from the fluid level sensors, analyzing the readings, and coordinating communication with the smart device.

Power Source (10): The controller requires a power source to operate, which can be either an internal battery or an external power supply. This power source also powers the fluid level sensors (3).

Fluid Level Sensors (3): The controller is connected to one or more fluid level sensors mounted externally on the tanks. These non-contact fluid level sensors, as described earlier, employ technologies like ultrasonic, optical, pressure, or capacitive sensors to measure the fluid levels without direct contact.

The block diagram indicates that the controller is connected to three fluid level sensors, but in certain embodiments, there might be a different number of sensors (e.g., one or two) depending on the specific requirements and configuration of the tank monitoring system.

In summary, FIG. 2 provides an overview of the essential components of both the smart device and the tank monitoring device's controller, highlighting their connectivity and functions in the context of the tank monitoring system.

Figure 3:
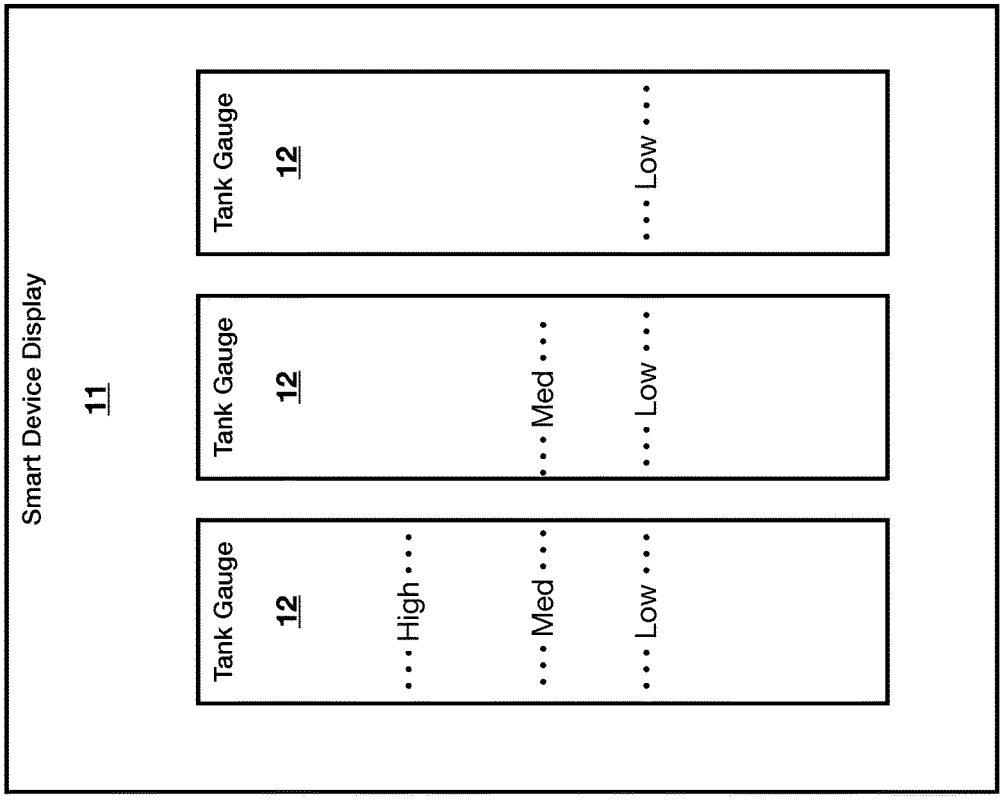
FIG. 3 is a wireframe diagram of a view or display for the smart device application.

FIG. 3 illustrates one of the display screens of the smart device application. The screen presents rectangular shapes (12), each representing the fluid level state of the tanks monitored by the smart device. The color fill of each rectangle corresponds to the analyzed fluid level readings obtained from the tank monitoring devices.

The smart device application dynamically adjusts the fill level displayed within each rectangle based on the configuration of fluid level sensors for each tank and their current fluid level readings or states. This allows users to visually and intuitively gauge the fluid levels in each tank at a glance.

The specific details of the display screen may vary, but the general concept is to provide users with an easy-to-understand visual representation of the fluid levels in the tanks. The color fill within each rectangle could change from, for example, green for a tank with a high fluid level, to yellow for a tank with a medium fluid level, and finally to red for a tank with a low fluid level approaching a critical level. The width of the fill within the rectangle may also vary, with wider fill indicating a higher fluid level and narrower fill indicating a lower fluid level.

By utilizing this graphical representation, users can conveniently monitor the fluid levels in multiple tanks simultaneously, facilitating better management and awareness of the fluid states in their recreational vehicle or other applications.

The smart device application serves as a software application running on a remote portable computer, such as a smartphone, tablet, laptop, or similar devices. Its primary function is to receive, process, and display fluid level data transmitted from the wireless vehicle tank monitoring system. This application provides a user-friendly interface for effectively managing and monitoring fluid levels in the recreational vehicle's fluid holding tanks.

Real-time fluid level data is continuously received from the non-contact fluid level sensors mounted on the outside of the fluid holding tanks. The smart device application promptly displays the fluid level states for each tank, presenting this information using graphical shapes like rectangles, bars, or circles that dynamically change based on the received fluid level data. Users can easily observe fluid level changes as they occur, enabling them to track remaining capacity in each tank and plan accordingly.

The graphical user interface (GUI) of the smart device application visually represents the fluid level states for each tank in an intuitive and easy-to-understand manner. Distinct colors, fill levels, or icons are used to indicate the current fluid level state, such as "full," "half-full," or "empty." This graphical display eliminates the need for complex numerical readings, enabling users to quickly assess the fluid levels at a glance.

Users have the flexibility to configure settings and parameters for each tank monitoring device connected to the fluid holding tanks. They can adjust the number of non-contact fluid level sensors connected to each tank monitoring device and fine-tune the sensitivity of these sensors to match specific tank characteristics or environmental conditions. Additionally, users can control the power supply to the fluid level sensors, allowing adjustments to sensor sensitivity or power conservation as needed.

The application features a notification system that provides near real-time alerts to users about significant changes in fluid level states. Users can set personalized threshold levels for each tank, and when fluid levels reach these thresholds (e.g., low or critical levels), the application sends notifications to the user's device. These notifications may take the form of audible alerts, visual pop-ups, or vibrations, ensuring users are promptly informed about any potential fluid level issues.

By tapping on a specific tank representation on the graphical display, users can access detailed information about that particular tank. The application presents additional data, such as the current power mode (battery, external battery, or external power), status of the fluid level sensors, and the time of the most recent fluid level reading change. Moreover, historical data, including past fluid level readings and trends for each tank, is accessible, aiding in tracking fluid usage patterns over time.

Historical tracking allows users to review and analyze fluid usage patterns, identifying trends and optimizing fluid management strategies. This information is invaluable for making informed decisions during travel and camping activities, ensuring efficient use of available fluid resources.

In summary, the smart device application offers a user-friendly, real-time monitoring, and management system for the fluid holding tanks in recreational vehicles. It empowers users with timely information, customizable settings, informative data, and historical tracking capabilities, facilitating informed decision-making for fluid management during travel and camping activities.

Figure 4:
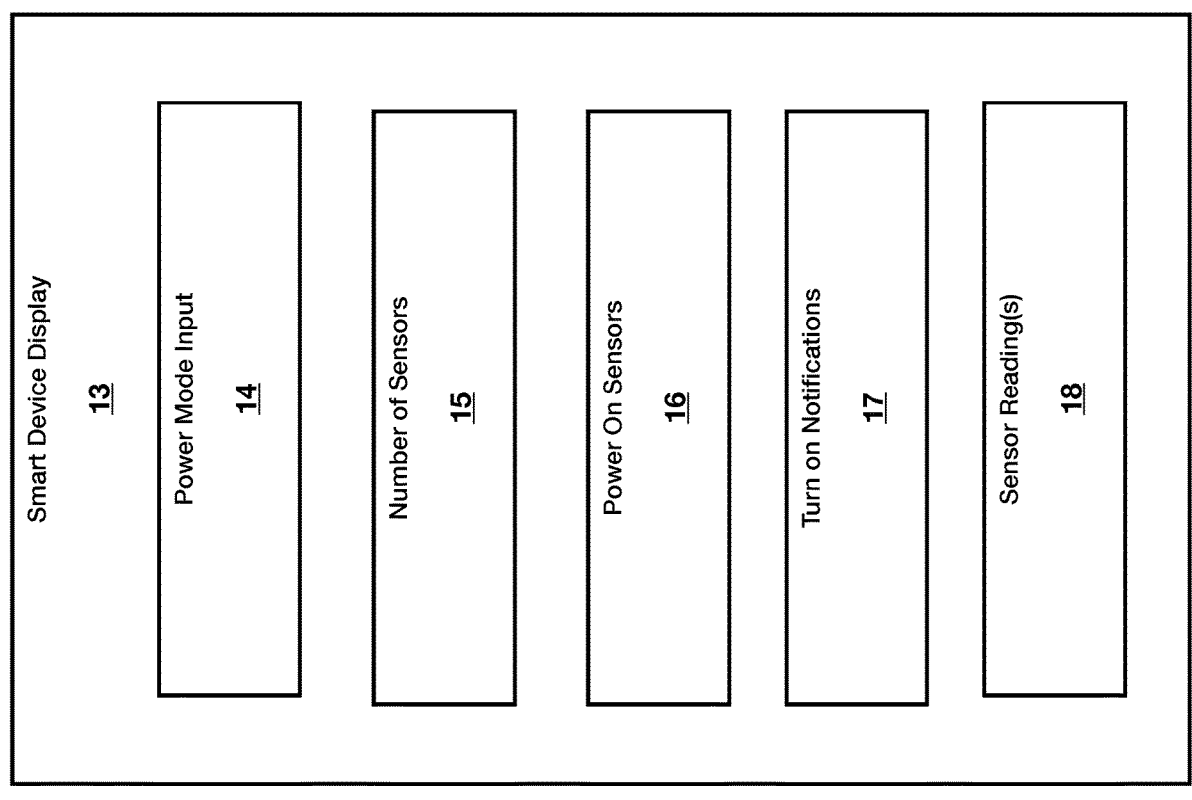
FIG. 4 is a wireframe diagram of a view or display for the smart device application.

FIG. 4 illustrates one of the display screens (13) for the smart device application, showcasing the information displayed and gathered when a user taps on a specific tank (12). When the user interacts with the tank representation, the display screen updates to provide more detailed information about the tank monitoring device and its current fluid sensor readings.

The display screen presents the current power mode (14) of the tank monitoring device, indicating whether it is powered by the internal battery, an external battery, or an external power source. The user can interact with the display to select and change the power mode according to their preferences.

The number of fluid level sensors connected to the tank monitoring device is also displayed, and users can easily modify this setting (15) as required. The application accepts user input to adjust the number of fluid level sensors, enabling the user to optimize the monitoring setup for each tank based on their specific needs.

Furthermore, the display screen exhibits the current power status for the fluid sensors connected to the tank monitoring device (16). The user can interact with the display to turn the sensors on or off, providing flexibility to adjust sensor sensitivity or conserve power whenever necessary.

The application also shows the current setting for notifying the user in near real-time of any changes in the fluid level state for the tank monitoring device (17). Users can choose their desired notification preferences and adjust the settings accordingly using the user-friendly interface.

A crucial part of the display is dedicated to presenting the current readings from each of the configured fluid level sensors attached to the tank monitoring device (18). The application provides the most up-to-date fluid level readings from the sensors, allowing users to monitor the tank levels accurately. Additionally, the display screen shows the time when the current fluid level reading changed state, providing a time-stamp for reference.

By offering such detailed and customizable information, the smart device application empowers users to make informed decisions regarding fluid management for each tank. Users can easily access and modify various settings, monitor real-time fluid level readings, and track the status of their fluid holding tanks with precision and ease. This level of control and data visibility ensures efficient usage of fluid resources and enhances the overall travel and camping experience for recreational vehicle owners.

Figure 5:
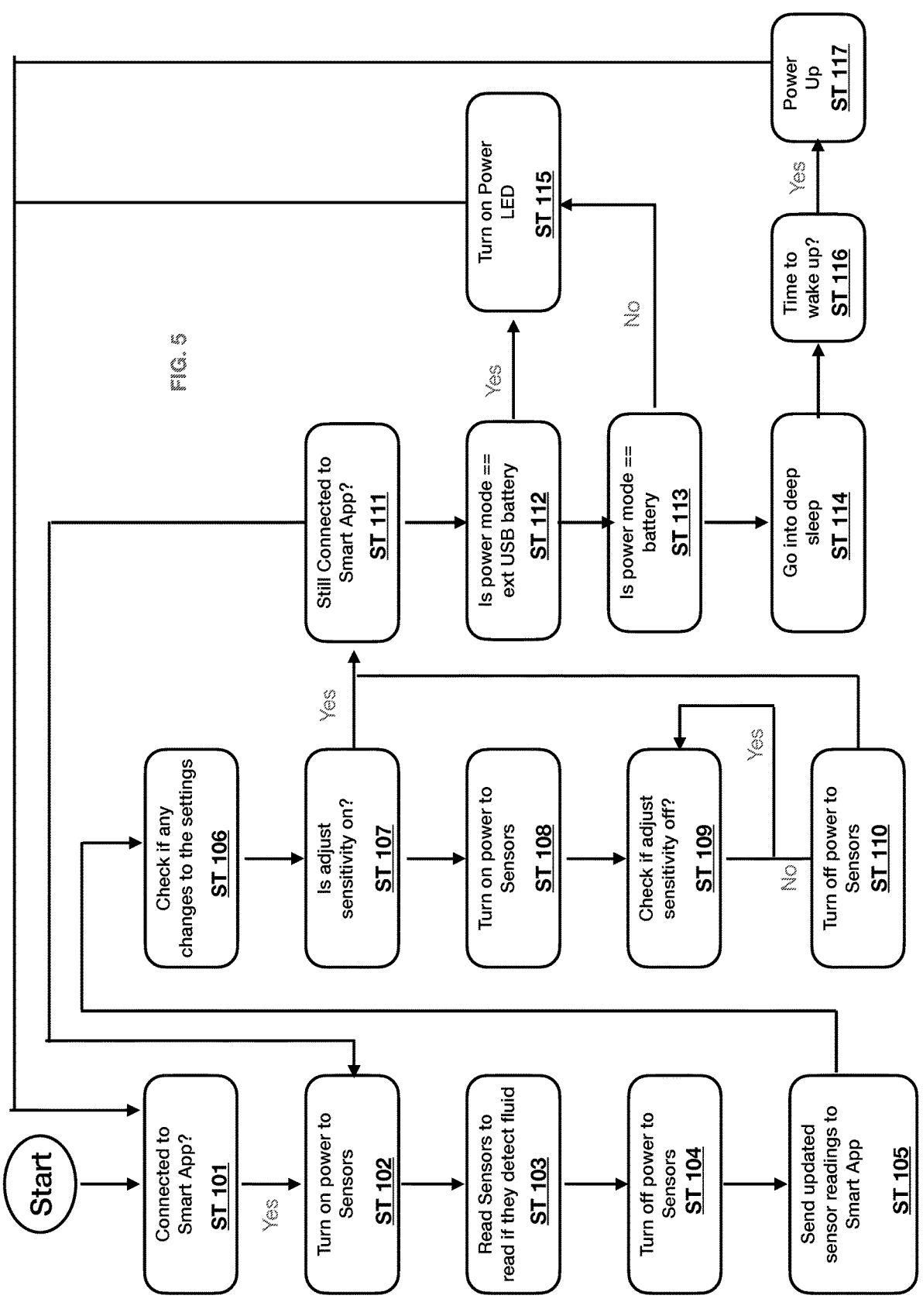
FIG. 5 is a partial flowchart for the logic of the method for the tank device controller.
Figure 6:
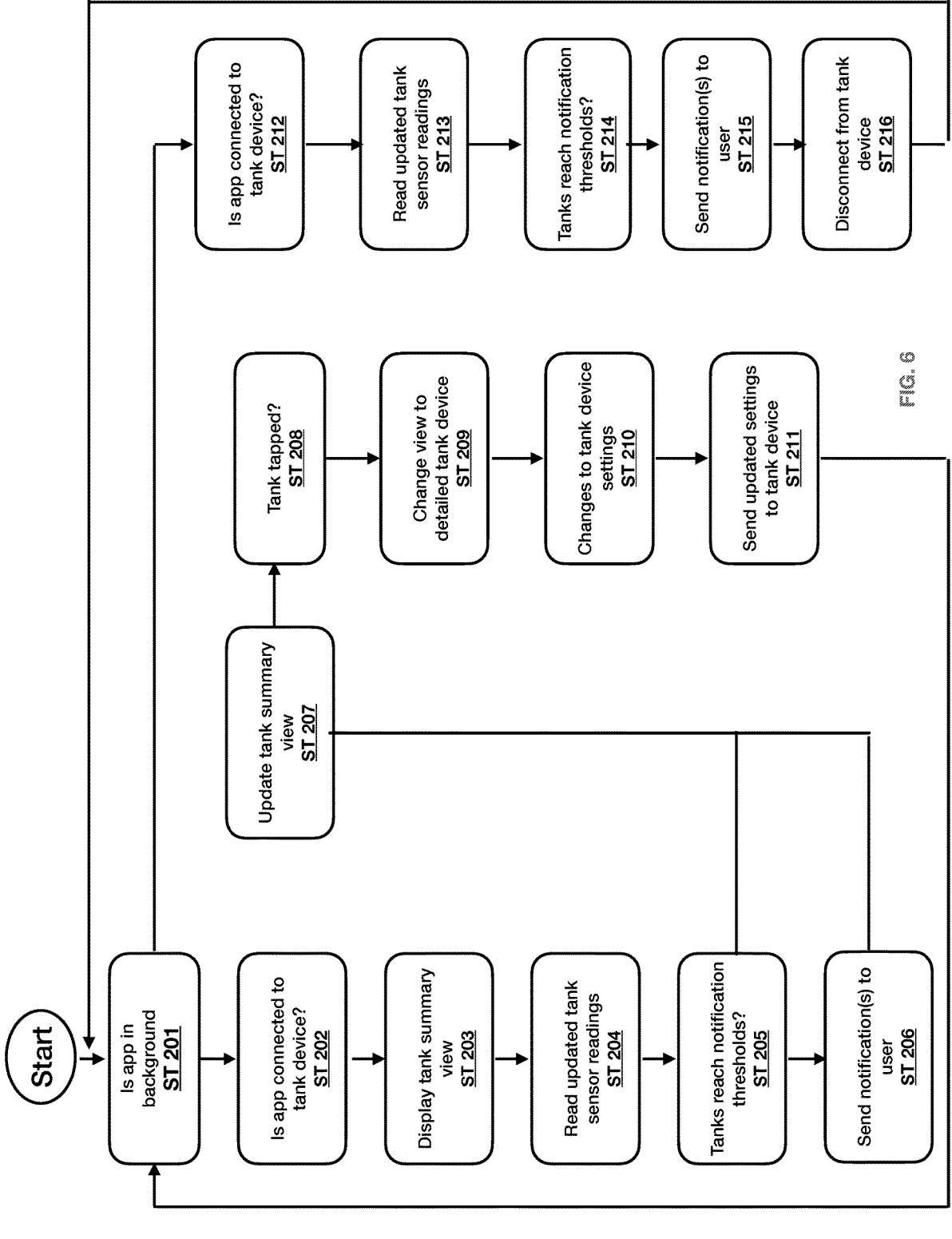
FIG. 6 is a partial flowchart for the logic of the method for the smart device application.

FIG. 5 shows the flow chart for the operation for the tank monitor device's microcontroller to read, process the sensor data, and update the smart app. The first step (ST101) is to check if the device has a communications connection to the smart app. If the device is connected to the smart app then the next step (ST102) is to turn on the power to the sensors. Next (ST103) the device reads the inputs on the microcontroller for which the sensors signal outputs are connected. Next (ST104) the power is turned off from the sensors. Next (ST105) the device sends the updated sensor readings to the connected smart app. Next (ST106) the device checks to if the settings have been changed by smart app and if so updates the internal settings. Next (ST107) it checks if the sensitivity adjustment has been turned. If so, then in the next step (ST108) it turns on the power to the sensors. Next (ST109) it waits for the sensitivity adjustment to be turned off. If so, the next step (ST110) is to turn off the power to the sensors (ST110). Next (ST111) the device checks to see if it is still connected to the smart app. If still connected then it repeats the process by returning to the first step (ST101). If it is no longer connected to the smart app then the next step (ST112) if configured to run off a external USB battery pack. If so then proceed to the next step (ST115). If not, then check if the device is configured to run off of an external power source and if so then proceed to the next step (ST115). If not external USB battery or external power then the next step (ST114) is to go into a deep sleep mode for a period of time. After the deep sleep time expires (ST116) then the next step (ST117) the next step is to power up and return to first step (ST101).

In one or more embodiments of the present invention, the tank monitoring device incorporates power management techniques to optimize the power consumption of the fluid sensors, as well as the overall device. This ensures efficient operation and extended battery life in battery-powered implementations. The fluid sensors are connected to switchable power supplies, allowing the device to modulate their power according to operational requirements.

To accomplish this, the tank monitoring device employs the microcontroller's general-purpose input/output (GPIO) pins as outputs to control the power supply to the fluid sensors. These GPIO pins can be configured to output a low or off signal, effectively turning off the power to the sensors, or a high or on signal, powering the sensors on.

During the fluid level measurement process (ST102), the device activates the power supply to the fluid sensors for a brief period. This enables the sensors to perform a reading of the current fluid level accurately. After obtaining the required data, the sensors are promptly powered off to conserve energy.

In addition to managing sensor power, the tank monitoring device implements low-power modes for the entire microcontroller. This low-power mode includes turning off or disabling other input and output functionalities on the microcontroller, such as the communication link to the smart device application. By doing so, the device minimizes any unnecessary power usage during idle or inactive periods.

Furthermore, the tank monitoring device features a "deep sleep" capability, allowing the microcontroller to enter a low-power state for a specific period. During this deep sleep mode, the microcontroller substantially reduces its power consumption, enabling significant energy savings. The device sets a timer to control the duration of the deep sleep period, after which it automatically wakes up to resume its normal operation.

By effectively managing the power to the fluid sensors and the entire device, the present invention ensures optimal power usage, extends battery life, and enhances the overall efficiency and reliability of the tank monitoring system. This power management approach aligns with the broader objective of providing a sustainable, user-friendly, and energy-efficient solution for fluid level monitoring in recreational vehicle tanks.

In certain embodiments of the present invention, non-contact fluid level sensors may incorporate a mechanical adjustment mechanism, such as an adjustment screw, to fine-tune the sensitivity of the sensor. This feature allows the sensor's performance to be optimized to account for variations in the thickness of the tank walls, ensuring accurate and reliable fluid level measurements.

The mechanical adjustment mechanism provides a means to modify the sensor's behavior, enabling it to adapt to different tank configurations, materials, and environmental conditions. By adjusting the sensitivity of the sensor, the distance at which it detects the fluid surface can be fine-tuned, compensating for potential variations in tank wall thickness and other factors that may affect the sensor's readings.

During the installation or setup process, users or technicians can utilize the adjustment screw or similar mechanical means to calibrate the sensor for specific tanks. By adjusting the sensor's sensitivity, it can be optimized to achieve precise and consistent measurements regardless of the tank's construction or other external factors that may influence the readings.

The incorporation of a mechanical adjustment mechanism enhances the versatility and usability of the non-contact fluid level sensors within the tank monitoring system. This feature ensures that the sensors can be effectively applied to different types of tanks, including those with varying wall thicknesses, providing accurate fluid level measurements and reliable monitoring capabilities for recreational vehicles and similar applications.

Throughout this patent, the term "non-contact fluid level sensors" may encompass sensor variants that include a mechanical adjustment mechanism, allowing for sensitivity adjustments to accommodate different tank configurations and materials. This aspect of the invention enhances the adaptability and performance of the tank monitoring system, making it a valuable solution for fluid level measurement and management in recreational vehicles and various other fluid storage applications.

In certain embodiments of the present invention, the tank monitoring device can be configured to provide a user-defined period during which the fluid level sensors are powered on. This feature allows the user to adjust the sensitivity of the sensors to match the current tank wall thickness or other specific tank characteristics.

When the user initiates the sensitivity adjustment process, the tank device activates the sensors for the predefined duration. During this time, the user can make necessary adjustments to the sensor sensitivity using the mechanical adjustment mechanism or other means, as described earlier. By interacting with the sensitivity adjustment feature during the designated period, the user can fine-tune the sensor's behavior to optimize its performance for the specific tank it is monitoring.

The ability to configure the sensor power-on period for sensitivity adjustments provides users with greater control and flexibility in calibrating the tank monitoring system according to their individual needs. This user-friendly approach ensures that the fluid level sensors are accurately calibrated to accommodate variations in tank wall thickness or other factors that may affect the sensor's readings.

Additionally, the tank device may incorporate an interface within the smart device application, allowing users to set and adjust the power-on duration for the sensors easily. The interface may also display relevant information during the sensitivity adjustment process, such as real-time sensor readings, enabling the user to observe the impact of sensitivity changes on fluid level measurements.

By offering a user-configurable sensor power-on period for sensitivity adjustments, the present invention enhances the tank monitoring system's adaptability and accuracy, providing an efficient solution for measuring fluid levels in various fluid holding tanks, especially in recreational vehicles and similar applications.

In certain embodiments of the present invention, the communications link between the wireless transceivers (7, 8) utilizes standard communication protocols such as Wi-Fi or Bluetooth Low Energy (BLE). Among these options, Bluetooth Low Energy (BLE) is particularly well-suited for the wireless vehicle tank monitoring system due to several key benefits.

First and foremost, one of the primary advantages of BLE is its low power consumption. BLE is specifically designed to be energy-efficient, making it ideal for battery-operated devices like the wireless vehicle tank monitoring system. By leveraging BLE, the system can efficiently transmit data between the non-contact fluid level sensors and the remote portable computer, reducing power consumption and extending the battery life of the monitoring devices.

Another significant benefit of BLE is its reliable and robust wireless connectivity. It enables seamless data transmission over short distances without the need for physical wires or connections. This wireless nature of BLE simplifies the installation process, reduces complexity, and eliminates the requirement for extensive wiring between the sensors and the display device.

BLE supports real-time data transmission, ensuring that fluid level data is promptly sent from the non-contact fluid level sensors to the remote portable computer with minimal delay. This real-time data transmission capability enables users to monitor fluid levels in the vehicle tanks in near real-time, enabling them to respond promptly to any changes or issues that may arise during their travel or camping activities.

Moreover, BLE enjoys widespread support in modern smart devices, including smartphones, tablets, and laptops. Most portable computers and mobile devices come equipped with built-in BLE capabilities, facilitating seamless integration with the smart device application running on the remote portable computer. This compatibility fosters user-friendly monitoring and visualization of fluid level data on a familiar interface.

Security is also a crucial consideration, and BLE incorporates robust security features, such as encryption and authentication, to protect the communication between the monitoring devices and the smart device application. These security measures ensure the privacy and integrity of the fluid level data, making the system resistant to unauthorized access or tampering.

Furthermore, BLE provides low latency and sufficient throughput for transmitting the relatively small data packets required for fluid level measurements. This ensures efficient and timely data exchange, even in crowded radio frequency environments.

In addition to its technical advantages, BLE technology is widely available and cost-effective, making it an attractive choice for integration into the wireless vehicle tank monitoring system. By employing BLE, the overall system cost can be kept reasonable, making it more accessible to potential users.

In conclusion, the utilization of Bluetooth Low Energy (BLE) as the communication protocol for the wireless vehicle tank monitoring system enhances power efficiency, wireless connectivity, real-time data transmission, data security, and compatibility with modern smart devices. These advantages align perfectly with the specific requirements and objectives of the invention, making BLE a suitable and advantageous choice for the communication protocol in the system. In one or more embodiments of the present invention the sensor data is encoded as packed binary to reduce the amount of data transmitted. Packed binary is a method of representing and organizing data in a compact and efficient manner. Individual data elements or values are stored in the smallest possible number of bits needed to represent them. In one or more embodiments of the present invention the sensor data is packed into one byte with one bit representing the on or off state of the sensor.

In certain embodiments of the present invention, the tank device employs a power-saving technique by transmitting the encoded sensor data to the smart device only when there is a change in the sensor data. This notification mechanism further reduces power consumption and optimizes the system's efficiency.

Instead of continuously sending sensor data at regular intervals, the tank device intelligently monitors the fluid level and detects changes in the tank's state. When there is a meaningful variation in the fluid level, such as a drop or increase in the level, the tank device triggers a notification to the smart device. The notification may include the encoded sensor data reflecting the updated fluid level.

By implementing this selective notification approach, the tank device minimizes unnecessary data transmission and conserves power. It avoids transmitting redundant or unchanged data, which would otherwise consume additional energy and potentially reduce the battery life of the monitoring system.

This power-saving technique is particularly beneficial when the fluid level in the tanks changes infrequently or gradually. Instead of repeatedly sending the same data to the smart device, the tank device only communicates when there is a noteworthy change, providing the user with relevant and timely information without unnecessary power consumption.

This notification-based strategy not only contributes to energy efficiency but also ensures that users receive prompt updates on significant changes in fluid levels, enabling them to manage the fluid usage more effectively during their travel or camping activities. The combination of power reduction and improved user experience makes this technique a valuable feature of the wireless vehicle tank monitoring system, aligning with the overall objectives of the invention.

In one or more embodiments of the present invention, the non-contact fluid level sensors are securely mounted on the outside of the fluid holding tanks using adhesive materials such as double-sided tape. These adhesive mounts ensure a firm attachment of the sensors to the tank surface, providing stability and accuracy during fluid level measurements.

The positioning of the sensors is carefully planned to measure the fluid levels at critical points as defined by the user. These critical levels can include measurements for nearly full, half-full, and nearly empty states, which are essential for effective monitoring and management of fluid levels in the tanks.

The controller, which processes the sensor data and communicates with the smart device, is also mounted using adhesive materials, such as double-sided tape or adhesive Velcro. The controller is positioned near the respective holding tank, ensuring convenient access for maintenance and adjustments. The strategic placement of the controller allows for easy management of the system without obstructing the vehicle's operations.

The non-contact fluid level sensors are connected to the controller using a sheathed wire bundle that typically extends to a length of 2-3 feet. This length provides adequate flexibility and reach for the sensors to connect with the controller without causing any interference or inconvenience.

For powering the controller, there are two options available. The controller can be powered by an internal battery, providing a self-contained power source for the device. Alternatively, an external battery can be used, which is mounted and connected next to the controller. This flexibility in power options allows users to choose the most suitable setup for their specific requirements, ensuring seamless operation of the wireless vehicle tank monitoring system.

Overall, the use of adhesive mounts and carefully designed wire connections ensures a reliable and efficient installation process for the non-contact fluid level sensors and the controller. The user-friendly setup enables hassle-free monitoring and management of fluid levels in the recreational vehicle's holding tanks, enhancing the overall travel experience and providing peace of mind to the users.

In one or more embodiments of the present invention, the calibration process for the non-contact fluid level sensors is designed to ensure accurate and reliable fluid level measurements. The calibration process can be easily performed by the user through the smart device application.

To initiate the calibration process, the user partially fills the tank to a known level. With the smart device application, the user activates the calibration mode, which powers on each sensor connected to the controller for that specific tank. As the sensors are powered on, the LED indicator on each sensor is activated when it detects fluid behind the tank wall. This LED indication helps the user determine the sensor's sensitivity and its response to the presence of fluid.

To calibrate each sensor, the user places the sensor on a known location of the tank where fluid is present. The user then turns the adjustment screw on the sensor until the LED indicator illuminates, indicating that the sensor is detecting the fluid level correctly. Once the LED is on, the user moves the sensor to a different location on the tank where there is no fluid and checks that the LED is off. If the LED is still on, the user adjusts the screw in the opposite direction until the LED turns off. This iterative process is repeated until the LED consistently turns on when the sensor is in the location with fluid and turns off when it is in the location without fluid.

The user repeats this calibration process for all the non-contact fluid level sensors connected to the controller for that specific tank. This ensures that each sensor is individually calibrated and adjusted for accurate readings based on the tank's unique characteristics.

Once the calibration is completed for all the sensors, the user can use the smart device application to turn off the calibration mode. The sensors are now accurately calibrated to provide precise and reliable fluid level measurements throughout the tank.

This calibration process allows users to fine-tune the sensitivity of each sensor to match the specific thickness and material of the tank walls. By enabling manual adjustments through the adjustment screw and using the LED indicator as a visual guide, the calibration process becomes user-friendly and straightforward, ensuring optimal performance of the non-contact fluid level sensors in the wireless vehicle tank monitoring system.

In one or more embodiments of the present invention, the wireless vehicle tank monitoring system is designed to be highly compatible with various recreational vehicles that feature non-metallic tanks. The non-contact fluid level sensors used in the system are mounted on the exterior sides of the tanks, eliminating the need for any modifications or invasive installations.

This design feature allows the system to seamlessly integrate with a wide range of recreational vehicles, including motorhomes, trailers, campers, and other similar vehicles, as long as they have non-metallic fluid holding tanks. Non-metallic tanks are commonly found in modern recreational vehicles and are typically made from materials such as polyethylene or fiberglass.

The installation process is straightforward, requiring only the attachment of the non-contact fluid level sensors to the outside of the tanks using adhesive materials, such as double-sided tape. The sensors can be strategically positioned to measure the fluid levels at critical points, as defined by the user, such as nearly full, half-full, and nearly empty.

Due to the non-invasive nature of the installation, there is no risk of damaging the tanks or compromising their structural integrity. This ensures that the wireless vehicle tank monitoring system is compatible with a broad range of recreational vehicles without requiring any significant alterations or additional installations.

By being compatible with various types of recreational vehicles, the wireless vehicle tank monitoring system offers a versatile and flexible solution for monitoring fluid levels during travel and camping activities. Users can benefit from the system's accurate and real-time fluid level data, allowing them to manage their resources efficiently and plan their trips with confidence. The ease of installation and compatibility with non-metallic tanks make the system accessible and beneficial to a wide audience of recreational vehicle owners.

While the foregoing written description of the invention enables one of ordinary skill to make and use what is considered presently to be the best mode thereof, those of ordinary skill will understand and appreciate the existence of variation, combinations, and equivalents of the specific embodiment, method, and examples herein. The invention should not be limited by the above described embodiment, method and examples, but by all embodiments and methods within the scope and spirit of the invention.

The invention claimed is:

1. A wireless recreational vehicle tank monitoring system comprising:
   a plurality of non-contact capacitive fluid level sensors, each of the plurality of sensors being mounted externally on a non-metallic wall of an existing recreational vehicle fluid holding tank by an adhesive attachment configured to permit retrofit installation without penetrating the tank wall, each sensor further including an adjustable sensitivity mechanism configured to compensate for variations in tank wall thickness and material properties;
   a microcontroller-based controller in electrical communication with the plurality of sensors, the controller being configured to (i) selectively apply power to the plurality of sensors via general-purpose input/output pins only during measurement intervals, (ii) determine discrete fluid level states of the tank from sensor outputs, (iii) enter a deep sleep state between measurement intervals, and (iv) selectively transmit sensor data only when a change in fluid level state is detected;
   a Bluetooth Low Energy (BLE) transceiver integrated with the controller, the BLE transceiver being configured to transmit said sensor data in a packed binary format in which individual sensor states are represented as bits, the transmitted data further including at least one of a battery level and a tank identifier; and
   a smart device application executing on a portable electronic device, the smart device application being configured to (i) display fluid level states for a plurality of recreational vehicle tanks including at least a fresh water tank, a gray water tank, and a black water tank, (ii) provide a calibration interface enabling a user to activate calibration mode, power on the sensors, and adjust sensor sensitivity while observing a corresponding visual indicator on each sensor to confirm detection, and (iii) store historical fluid usage data with timestamps and present usage trends to facilitate trip planning.

2. The system of claim 1, wherein each sensor includes an LED indicator that illuminates when fluid detection is confirmed during calibration.

3. The system of claim 1, wherein the BLE transceiver transmits event-driven advertisement packets only when sensor state changes occur.

4. The system of claim 1, wherein the historical fluid usage data further includes user-defined alerts when fluid level thresholds are reached.

5. The system of claim 1, wherein the adhesive comprises a removable mounting tape permitting retrofit installation on existing tanks.

6. The system of claim 1, wherein the packed binary transmission encodes at least four sensors per tank as single-bit states within a single BLE packet.

7. The system of claim 1, wherein the controller is configured to operate for more than six months on a self-contained battery by cycling sensor power and transmitting only when state changes occur.

8. The system of claim 1, wherein the smart device application is configured to concurrently display and monitor fluid levels across a plurality of recreational vehicle tanks including at least a fresh water tank, a gray water tank, and a black water tank, and to provide tank-type-specific alerts based on the respective tank.

9. A method of monitoring fluid levels in recreational vehicle tanks, comprising:
   mounting a plurality of non-contact capacitive fluid level sensors externally on a non-metallic wall of an existing recreational vehicle fluid holding tank by an adhesive attachment configured to permit retrofit installation without penetrating the tank wall, each sensor including an adjustable sensitivity mechanism configured to compensate for variations in tank wall thickness and material properties;
   establishing electrical communication between the plurality of sensors and a microcontroller-based controller;
   selectively applying power to the plurality of sensors via general-purpose input/output pins of the controller only during measurement intervals;
   determining, by the controller, discrete fluid level states of the tank from sensor outputs;
   entering, by the controller, a deep sleep state between measurement intervals;

transmitting, by a Bluetooth Low Energy (BLE) transceiver integrated with the controller, said sensor data in a packed binary format in which individual sensor states are represented as bits, the transmitted data further including at least one of a battery level and a tank identifier, wherein said transmission occurs only when a change in fluid level state is detected; and executing, on a portable electronic device, a smart device application configured to display fluid level states for a plurality of recreational vehicle tanks including at least a fresh water tank, a gray water tank, and a black water tank, provide a calibration interface enabling a user to activate calibration mode and adjust sensor sensitivity while observing a visual indicator on each sensor to confirm detection, and store historical fluid usage data with timestamps and present usage trends to facilitate trip planning.

10. The method of claim 9, further comprising illuminating, on each sensor, an LED indicator when fluid detection is confirmed during calibration.

11. The method of claim 9, wherein the BLE transceiver transmits event-driven advertisement packets only when sensor state changes occur.

12. The method of claim 9, wherein storing historical fluid usage data further includes presenting user-defined alerts when fluid level thresholds are reached.

13. The method of claim 9, wherein mounting the plurality of sensors comprises applying a removable adhesive tape that permits retrofit installation on existing tanks.

14. The method of claim 9, wherein the packed binary transmission encodes at least four sensors per tank as single-bit states within a single BLE packet.

15. The method of claim 9, wherein the controller operates for more than six months on a self-contained battery by cycling sensor power and transmitting only when state changes occur.

16. The method of claim 9, wherein the smart device application concurrently displays and monitors fluid levels across a plurality of recreational vehicle tanks including at least a fresh water tank, a gray water tank, and a black water tank, and provides tank-type-specific alerts based on the respective tank.

* * * * *